Nov. 26, 1957 R. N. FALGE 2,814,749
LIGHTING ELEMENT FOR AUTOMOTIVE VEHICLE LAMPS
Filed Jan. 9, 1953
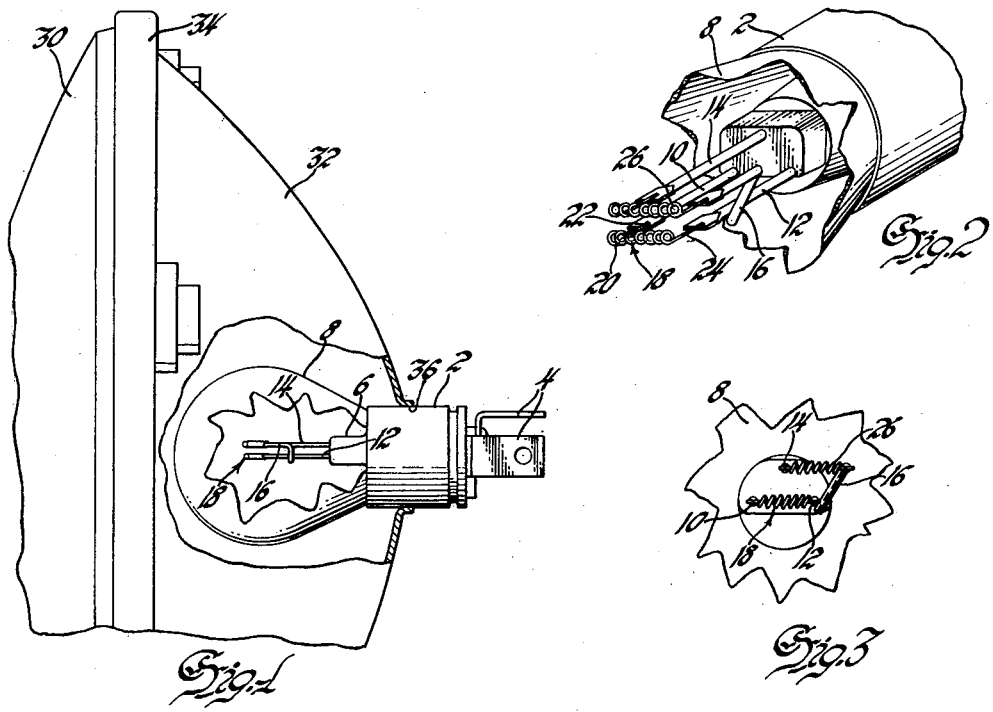
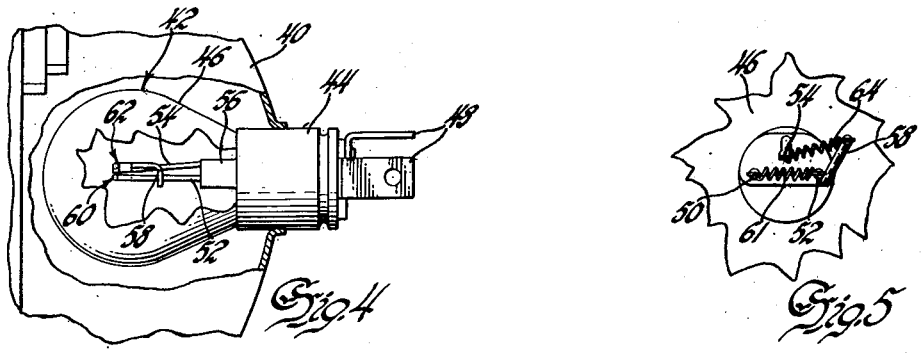
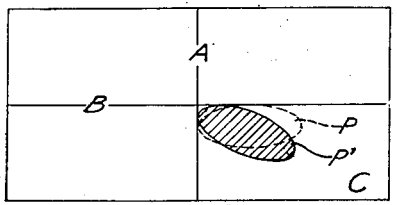
Inventor
Robert N. Falge
By Willits, Helmig & Baillio
Attorneys United States Patent Office 2,814,749
Patented Nov. 26, 1957

2,814,749

LIGHTING ELEMENT FOR AUTOMOTIVE VEHICLE LAMPS

Robert N. Falge, Anderson, Ind., assignor to General Motors Corporation, Detroit, Mich., a corporation of Delaware Application January 9, 1953, Serial No. 330,401

4 Claims. (Cl. 313—115)

This invention relates to light bulbs and more particularly to an improved filament arrangement for automotive vehicle headlamp light bulbs of the type having two filaments, one for high beam or country driving and the other for low beam or city driving.

One of the major problems involved in automotive lighting systems is that of increasing the efficiency of the low beam light pattern. The beam, which is designed for use in country driving when there are no oncoming vehicles, may be quite bright and may be scattered to cover a large area in front of the vehicle so as to afford maximum lighting both to the left and to the right and far down the road. The low beam, however, is designed for use when there are oncoming vehicles, at which time, it is essential that the light be restricted to certain areas so as to preclude headlight glare from "blinding" oncoming drivers. It is, of course, also important to obtain maximum low beam lighting within these certain areas. Thus, it has been a goal of the automotive lighting industry to design the low beam pattern so as to afford both maximum lighting and maximum safety.

It is, therefore, an object of this invention to provide a two filament type automotive vehicle headlamp light bulb which has improved low beam lighting characteristics. Another object of the invention is the provision of a two filament type light bulb which can be more easily assembled with close tolerances thereby affording improved lighting. Other objects and advantages will appear more clearly from the following description of a preferred embodiment and from the drawings in which:

Figure 1 is a side view with parts broken away of a conventional two filament light bulb mounted in a headlamp for an automotive vehicle;

Figure 2 is a perspective view with parts broken away of the filament arrangement used in the conventional type light bulb;

Figure 3 is a side view with parts broken away of the light bulb shown in Figure 2;

Figure 4 is a side view with parts broken away of the improved light bulb of this invention mounted in an automotive vehicle headlamp;

Figure 5 is a front view with parts broken away of the light bulb shown in Figure 4; and Figure 6 is a lighting diagram comparing the beam characteristics of the conventional light bulb with those of the improved light bulb of this invention.

The conventional filament arrangement which is in common use on multiple beam automobile headlamp light bulbs can best be seen with reference to Figures 1, 2 and 3. The light bulb consists of a metal base 2 of conventional construction having contacts 4 from which extend through the base, metal conductors to make contact with filament leads. Glass insulating material 6 is molded around the conductors and the base portion of the leads hereinafter described. A glass bulb 8 sealed to the insulator 6 and to the base in the conventional manner envelops the leads and filaments and may either be evacuated or filled with an inert gas as is the usual practice.

Three leads 10, 12 and 14 are used, leads 10 and 12 lying in the same horizontal plane and lead 14 being positioned slightly above and between leads 10 and 12. An elbow joint 16 is welded to lead 12 and extends upwardly and then outwardly therefrom. A generally U-shaped major filament 18 having a straight elongated spiral portion 20 and angularly disposed legs 22 and 24 is positioned across leads 10 and 12 by securing the ends of the respective legs to the ends of the leads. A minor filament 26 having the same general structure as the major filament is, in the same manner, positioned between the end of the elbow joint 16 and the end of lead 14. Any suitable means may be used for securing the filament legs to the ends of the leads. The most common means used for securing the filaments to the leads is by the use of joints resulting from heating the filament legs to soften the metal of the leads thereby causing the filament legs to embed into the lead metal to secure the filament permanently in place.

It will be noted that with this standard filament arrangement, the filaments are disposed parallel to each other and extend horizontally and transversely within the bulb envelope. Generally, the major filament is positioned so that it will be on the focal point of the reflector when the light bulb is properly mounted and the minor filament is located above the focal point in parallel relationship with the major filament and as close thereto as mechanical and electrical tolerances will allow. The mounting can be seen with reference to Figure 1 which shows the light bulb properly positioned and secured in a sealed headlamp unit. The unit comprises a lens member 30 and a parabolic concave reflector 32 secured together in sealed relationship by means of the flange 34 which is provided on the periphery of the reflector and which is turned over the edge portion of the lens. The bulb is mounted and secured in an opening 36 provided on the center of the reflector so that the major filament 18 is positioned on the focal point of the reflector and the minor filament 26 slightly thereabove.

This lamp, when mounted on a vehicle, operates to project a high beam of light down the road when the major filament is lighted and a low beam to the immediate front of the vehicle and to the right side of the road when the minor filament is burning. In order to assure safe night driving by preventing glare from the low beam to the drivers of oncoming vehicles, the low beam or minor filament hot spot must be restricted to the lower right hand quadrant formed by the vertical and horizontal lines which pass through the center of the high beam pattern when the lamp is properly aimed. This can be seen by reference to Figure 6 in which the intersection of the lines A and B represents the center of the high beam pattern on a vertical screen, and C designates the lower right quadrant to which the low beam hot spot is restricted. Within this quadrant C, however, it is highly desirable to project as much as possible of the light from the low beam hot spot into the upper left hand corner, thereby assuring a maximum amount of low beam light toward the center of the road. The light pattern P which is shown in the broken outline in Figure 6 represents that of the hot spot from the low beam filament of the above described conventional light bulb. It will be noted that the hot spot pattern is elliptical in shape with the major axis of the pattern being parallel with the longitudinal axis of the minor filament from which it emanates. Thus, the minor filament of the conventional bulb being horizontal, the major axis of the minor filament hot spot pattern P is also horizontal and since the pattern is restricted to the quadrant C, there results a scarcity of light, or a dark spot, in the upper left hand corner of the quadrant. The effect of this is a less efficient low beam pattern, the dark spot in the quadrant resulting in a lack of seeing light down the road where proper low beam lighting should be at a maximum.

In accordance with this invention, the minor filament, instead of being arranged horizontally, is arranged at an angle so that the elliptical pattern of the minor filament hot spot will reach further into the upper left hand corner of the quadrant C when the lamp is properly adjusted and aimed. Under driving conditions, this improved arrangement results in more light toward the center of the road and thus eliminates the lack of seeing light at this point which is characteristic of conventional headlamps.

For a better understanding of my invention, reference is made to Figures 4 and 5 in which 40 is a parabolic reflector having a lens mounted thereon as described in conjunction with Figure 1, and 42 is a light bulb embodying the present invention. The bulb 42 has the usual metal base 44, evacuated or inert gas filled glass envelope 46, and contacts 48 for establishing electrical connection with three metal leads 50, 52 and 54 which project from the glass seal 56 as described above with reference to Figures 1, 2 and 3. Leads 50 and 52 lie in the same horizontal plane and lead 54 is positioned slightly above and between leads 50 and 52. Elbow joint 58 is welded to lead 52 and extends upwardly and then outwardly therefrom, the free end of the elbow 58 being positioned slightly above the free end of lead 54. A generally U-shaped major filament 60 having a generally straight elongated spiral portion 61 is electrically connected across the leads 50 and 52 by securing its legs to the free ends of the respective leads in any suitable manner such, for example, as that heretofore described. Similarly, a generally U-shaped minor filament 62, also having a generally straight elongated spiral portion 64 is electrically connected across the free end of lead 54 and the free end of the elbow joint 58.

In the embodiment shown, the spiral portion 61 of the major filament is arranged horizontally, while the minor filament spiral portion 64 is positioned at about a 10° angle to the horizontal or, in this instance, at about 10° with respect to the major filament. As can best be seen by reference to Figure 5, the right hand end of the minor spiral portion 64 is higher than the left hand end as seen from the front of the bulb. Thus, the low beam hot spot, which emanates from the minor filament, will be oriented as shown by the darkened pattern P' in Figure 6. It will be noted that the rotated hot spot pattern P' which results from a lamp utilizing a bulb constructed in accordance with the present invention, reaches further into the upper left hand corner of quadrant C than is the case with the conventional pattern P. On the road, the improved hot spot orientation results in highly improved low beam lighting in that it provides more seeing light down the road and reduces the dark area in the immediate front of the vehicle, both of which are characteristic of the low beam light pattern of conventional bulbs.

I have found that a minor filament oriented with respect to the horizontal, at an angle of from 4° to 16° results in a highly improved low beam light pattern. Within this range, an orientation of about 10° is, however, most preferable since at this angle, sufficient light can be put into the quadrant corner heretofore described to provide a great amount of additional seeing light without at the same time pulling the other end of the minor hot spot pattern down so low as to detrimentally affect the light pattern. As is shown in the drawings, the longitudinal axis of the major filament generally extends horizontally in the bulb envelope and when such is the case, the minor filament, in accordance with the present invention, will be oriented at an angle to the major.

While I have described my invention with reference to a light bulb of the type used in a lamp unit utilizing a metal reflector, it is to be understood that the invention is equally useful in sealed beam units which have an all glass hermetically sealed construction and in which the lamp lens and reflector assembly serves as the bulb envelope. The invention can also, of course, be used with bulbs having four leads, that is, two separate leads for each filament, rather than the three lead structure herein described.

I claim:

1. A headlamp for automotive vehicles comprising a concave reflector, and a lighting element mounted in said reflector, said lighting element having an elongated major filament on the focal point of said reflector and parallel with the horizontal plane of said reflector, and an elongated minor filament positioned adjacent said major filament, said minor filament being at an angle of from about 4° to 16° to said major filament so that the minor filament light pattern on a vertical screen is within the lower right quadrant established by vertical and horizontal lines drawn through the center of the major filament light pattern, and is at an angle to the horizontal line thereby positioning the left edge of the minor light pattern in the upper left corner of said quadrant.

2. A headlamp for automotive vehicles comprising a concave reflector, and a lighting element mounted in said reflector, said lighting element having an elongated major filament on the focal point of said reflector and parallel with the horizontal plane of said reflector, and an elongated minor filament positioned adjacent said major filament, said minor filament being at an angle of about 10° to said major filament so that the minor filament light pattern on a vertical screen is within the lower right quadrant established by vertical and horizontal lines drawn through the center of the major filament light pattern, and is at an angle of 10° to the horizontal line thereby positioning the left edge of the minor light pattern in the upper left corner of said quadrant.

3. In an automotive vehicle headlamp, a concave parabolic reflector member and a lighting element mounted in said reflector member, said lighting element comprising an elongated substantially straight major filament and an elongated substantially straight minor filament positioned adjacent said major filament, the longitudinal axes of said major and said minor filaments extending transversely to the focal axis of said reflector, the longitudinal axis of said minor filament being at an acute angle to the longitudinal axis of said major filament.

4. In an automotive vehicle headlamp, a concave parabolic reflector member and a lighting element mounted in said reflector member, said lighting element comprising an elongated substantially straight major filament on the focal point of said reflector and an elongated substantially straight minor filament positioned adjacent said major filament, the longitudinal axes of said major and said minor filaments extending transversely to the focal axis of said reflector and lying in substantially the same vertical plane, the longitudinal axis of said minor filament being at an acute angle to the longitudinal axis of said major filament.

References Cited in the file of this patent

UNITED STATES PATENTS

| | | |
|---|---|---|
| 1,863,547 | Arbuckle | June 14, 1932 |
| 1,913,196 | Falge et al. | June 6, 1933 |
| 1,929,111 | Falge | Oct. 3, 1933 |
| 2,121,765 | Reiman et al. | June 21, 1938 |
| 2,144,400 | Birdseye | Jan. 17, 1939 |